April 3, 1928.
B. C. VON PLATEN ET AL
1,664,472
REFRIGERATING APPARATUS
Original Filed March 6. 1924
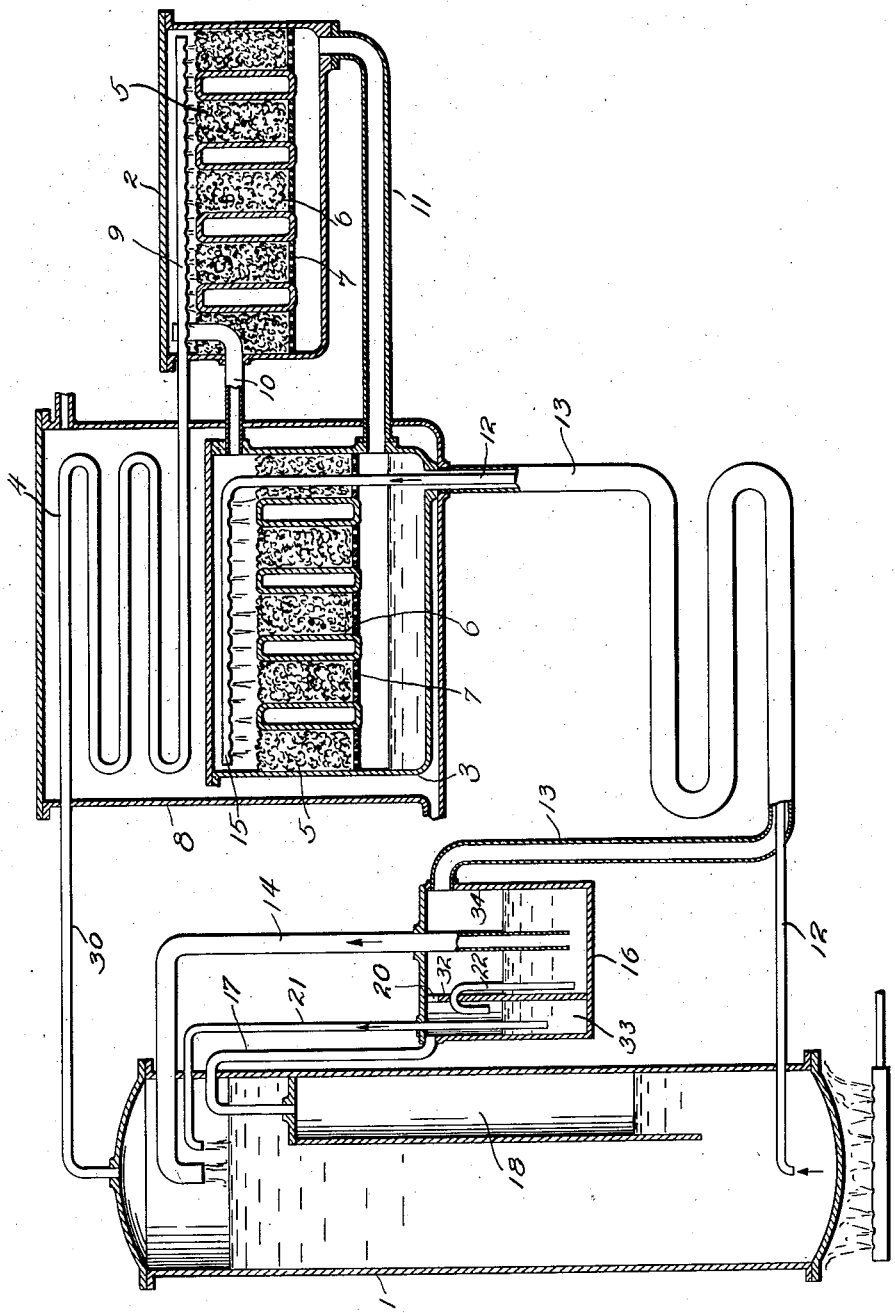

Patented Apr. 3, 1928.

1,664,472

UNITED STATES PATENT OFFICE.

BALTZAR CARL VON PLATEN AND CARL GEORG MUNTERS, OF STOCKHOLM, SWEDEN, ASSIGNORS TO ELECTROLUX SERVEL CORPORATION, OF NEW YORK, N. Y., A CORPORATION OF DELAWARE.

REFRIGERATING APPARATUS.

Original application filed March 6, 1924, Serial No. 697,418, and in Sweden March 8, 1923. Divided and this application filed June 8, 1926. Serial No. 114,425.

This application is a division of our copending application Serial No. 697,418, filed March 6, 1924.

The invention relates to apparatus for circulating liquid within refrigerating apparatus and, more particularly, relates to the circulation of absorption liquid between the generator and absorber in refrigerating apparatus of the absorption type wherein a pressure equalizing medium is used to equalize pressure throughout the apparatus.

The invention will be described with reference to the accompanying drawing which shows a refrigerating apparatus of the type described and claimed in our copending application Serial No. 596,646, filed October 24, 1922, Patent No. 1,609,334 granted December 7, 1926, to which the present invention is applied.

The refrigerating apparatus comprises a generator 1, an evaporator 2, an absorber 3 and a condenser 4, which are connected to from a hermetically closed circulating system having a major cycle of circulation for a cooling agent, a local cycle of circulation for a pressure equalizing medium, and a local cycle of circulation for absorption liquid. The generator 1 contains the cooling agent and absorption liquid from which the cooling agent is expelled by application of heat to the generator. For ease of description we will select ammonia as the cooling agent and water as the absorption liquid contained within generator 1. The absorber and evaporator contain a pressure equalizing medium and we select hydrogen for this medium to act in conjunction with ammonia and water.

The evaporator and absorber each contain means for spreading liquid over a large surface consisting, in the instant case, of iron wool or cuttings 5. The distributing material is disposed in a number of cells 6 which are provided with perforated bottoms 7 and which communicate with each other. The condenser 4 which is interposed in conduit 30 connecting generator 1 with evaporator 2 is placed within the cooling water tank or jacket 8. Cooling jacket 8 also surrounds absorber 3. Within evaporator 2 conduit 30 is perforated to form a distributor 9 for liquid ammonia condensed in condenser 4. The evaporator and the absorber communicate at their upper portions respectively by means of conduit 10 and at their lower portions respectively by means of conduit 11. Conduit 10 may be arranged to extend within conduit 11 whereby heat is exchanged from the fluid within conduit 10 to the fluid within conduit 11.

The generator and the absorber are connected by means of conduits 12 and 13, a riser 14 and a receptacle 16, which parts form a local closed circulating system for the absorption liquid. Conduit 12 opens at one end in the lower portion of the generator and, at the other end, in the upper part of the absorber where it forms a perforated distributor 15. Conduit 12 extends within conduit 13 to form a heat-exchanger.

Vessel 16 is divided into two chambers 33 and 34 by means of a wall 32. The two chambers communicate by means of opening 20 in the upper portion of wall 32. A pressure equalizing conduit 21 enters chamber 33 and projects downwardly within the same to a level somewhat above the bottom of chamber 33. The other end of conduit 21 extends within generator 1 and opens therein at a level above the level of liquid within the generator. Riser conduit 14 extends downwardly within chamber 34 to a level somewhat below that at which conduit 21 opens into chamber 33. The other end of riser conduit 14 extends within the generator and also opens at a level above the level of liquid within the generator. Conduit 13 is connected to the upper part of vessel 16 and extends downwardly so that it can contain a liquid column which is higher than the liquid column filling riser conduit 14. The upper part of chamber 33 communicates, by means of conduit 17, with a pressure reservoir 18 located within the liquid space of the generator, which pressure reservoir is open at the bottom and closed at the top except for connection with chamber 33 whereby an excess pressure may be produced above the generator gas pressure in the upper part thereof against a liquid column consisting of liquid within the generator between the level in reservoir 18 and the generator proper.

Vessel 16 is located below absorber 3 so that liquid may flow by gravity from the absorber into the same.

The apparatus operates as follows:

Ammonia is expelled from solution in the absorption liquid in the generator 1 due to the application of heat and ammonia vapor thus formed flows through conduit 30 and into condenser 4 where it is liquefied. Liquid ammonia enters the evaporator 2 through perforated distributor 9 and is spread out over the material 5 of large surface. Hydrogen enters the evaporator through conduit 10. The ammonia diffuses into the hydrogen and evaporates due to the decrease in partial pressure made possible by the introduction of hydrogen. As the ammonia evaporates, heat is absorbed from the surroundings of the evaporator, thus producing refrigeration. Due to the difference in specific weights of the vapor of ammonia and the hydrogen, the gas mixture in the evaporator is heavier than the gas contained in the absorber which is composed to a greater extent of hydrogen, as a result of which the mixture of hydrogen and ammonia in the evaporator flows downwardly and through conduit 11 into the lower part of absorber 3. Here the ammonia is brought into contact with the absorption liquid which is sprayed out through distributor 15. The absorption liquid absorbs the ammonia but does not absorb the hydrogen. The hydrogen is thus separated from the ammonia and flows upwardly within the absorber and back through conduit 10 to the evaporator to again pass through the local evaporator-absorber cycle. An automatic continuous circulation of the inert gas through the absorber and evaporator is thus maintained due to the different specific weights of the different gases.

A liquid circulation is produced between the generator and absorber wherein absorption liquid strong in ammonia is carried from the absorber to the generator and absorption liquid weak in ammonia is carried from the generator to the absorber. This circulation takes place as follows:

Assume, first, that pressure reservoir 18 and chambers 33 and 34 are filled with liquid. Riser conduit 14 will contain liquid to the same height as the level of liquid in the absorber. Likewise conduit 21 will contain liquid to the same height as in the absorber. Now assume that heat is applied to generator 1. This causes a generation of vapor in pressure reservoir 18 and an accumulation of vapor in the upper portion thereof. The liquid level in pressure reservoir 18 is thus lowered and the pressure of the vapor therein increases in order to displace the liquid. There is thus an excess of pressure in reservoir 18 above that existent in the upper part of the main body of generator 1. The excess of pressure is communicated through conduit 17 to chamber 33, and by means of opening 20 and conduit 22, to chamber 34. The excess of pressure thus forces the pools of liquid in chambers 33 and 34 downwardly, at the same time causing liquid to retreat through conduit 13 toward the absorber. The excess pressure continues to rise in degree against the liquid in the generator proper until the pressure is so great that liquid is lifted through riser conduit 14 into the upper part of generator 1.

When the pool of liquid in chamber 33 has been lowered to open the lower end of conduit 21 to vapor in chamber 33, the vapor lifts the liquid in conduit 21 and forces it into the upper part of the generator. To this end conduit 21 is made narrow so that vapor will not pass through liquid within the same. When the liquid in conduit 21 has been driven out into the generator there is a communication for vapor between reservoir 18 and the upper part of the generator proper. This results in an equalization of the excess pressure with respect to the generator gas pressure and the liquid level rises again in reservoir 18 and liquid passes from the absorber through conduit 13 into chamber 34 and when the liquid level in chamber 34 has again risen to the top of siphon 22 liquid passes therethrough into chamber 33 and thus chambers 33 and 34 again become filled, or filled to a major extent, with liquid. The circulating arrangement which in the nature of a pump intermittently operating to force liquid from the absorber to a higher level in the generator is then ready to begin its operation anew.

Liquid flows by gravity from the generator into the absorber through conduit 12. Riser conduit 14 may be of any size since, in operation, it is always filled with liquid and, by suitably proportioning and arranging the parts, a rate of circulation of any desired magnitude may be obtained.

For the purpose of illustration we have described one modification in detail, but it is to be understood that the invention is interpreted by the appended claims and the state of the prior art is not to be limited to the modification disclosed.

Having thus described our invention what we claim is:

1. Refrigerating apparatus comprising a generator, a condenser, an evaporator, an absorber, an upwardly extending riser conduit opening into said generator and arranged to communicate with the liquid space of the absorber, a second conduit connected to communicate with said generator and arranged so that pressure variations occurring within the same are transmitted to liquid in said riser conduit, means to form a pool of liquid in communication with said second conduit and means to apply an excess pressure to said pool and to liquid in said riser conduit to move liquid in the riser conduit into the generator, said means operating to move the liquid of said pool to uncover the end of said second conduit communicating therewith to equalize the excess pressure.

2. Refrigerating apparatus comprising a generator, a condenser, an evaporator, an absorber, an upwardly extending riser conduit opening into the upper part of the generator, means to form a pool of liquid at the lower end of said riser conduit, a second upwardly extending conduit opening into the upper part of the generator, means to form a second pool of liquid at the lower end of the second conduit, means to apply an excess generated pressure to said pools, means to conduct liquid from the absorber to the first pool and a siphon to conduct liquid from the first pool to the second pool.

3. Refrigerating apparatus comprising a generator, a condenser, an evaporator, an absorber, an upwardly extending riser conduit opening into the upper part of the generator, means to form a pool of liquid at the lower end of said riser conduit, a second upwardly extending conduit opening into the upper part of the generator, means to form a second pool of liquid at the lower end of the second conduit, the second upwardly extending conduit having its lower end at a higher level than the lower end of the riser conduit, means to conduct liquid from the absorber to the pools and means to supply an excess pressure to the pools.

4. Refrigerating apparatus comprising a generator, a condenser, an evaporator, an absorber, an upwardly extending riser conduit opening into the upper part of the generator, means to form a pool of liquid at the lower end of said riser conduit, a second upwardly extending conduit opening into the upper part of the generator, means to form a second pool of liquid at the lower end of the second conduit, the second upwardly extending conduit being so narrow that gas will not pass through liquid within the same, means to conduct liquid from the absorber to the pools and means to supply an excess pressure to the pools.

5. Refrigerating apparatus comprising a generator, a condenser, an evaporator, an absorber, an upwardly extending riser conduit opening into the upper part of the generator, means to form a pool of liquid at the lower end of said riser conduit, a second upwardly extending conduit opening into the upper part of the generator, means to form a second pool of liquid at the lower end of the second conduit, means to apply an excess generated pressure to said pools, and connecting means between the absorber and the pools adapted to hold a liquid column counterbalancing the liquid column in the riser pipe.

6. Refrigerating apparatus comprising a generator, a condenser, an evaporator and an absorber forming a system, a pressure reservoir, a first chamber, a second chamber, a connection between the upper part of said pressure reservoir and said second chamber, an equalizing pipe extending from said second chamber to the gas space of said generator, a siphon arranged between said chambers, a communication between said chambers, a riser conduit extending from said first chamber to the gas space of said generator, a conduit extending between the absorber and the first chamber adapted to hold a liquid column higher than in the riser conduit, a conduit extending between the generator and the absorber and means to heat the generator and the pressure reservoir.

7. Refrigerating apparatus comprising a generator, an absorber, evaporating and liquefying means, the aforesaid parts being connected in a system, said system including a plurality of conduits for circulating absorption liquid between the generator and absorber and means to alternately force gaseous and liquid fluid through one of said conduits and thereby cause a flow of unbroken liquid through a plurality of other conduits of said plurality of conduits.

8. Refrigerating apparatus comprising a generator, an absorber, evaporating and liquefying means, the aforesaid parts being connected in a system, said system including a plurality of conduits for conducting absorption liquid to the generator from the absorber, one of said conduits being narrow so that gas will not pass through liquid within the same and means to alternately force gaseous and liquid fluid through the narrow conduit into the generator and thereby cause flow of liquid through another of said plurality of conduits into the generator.

9. Refrigerating apparatus comprising a generator, an absorber, evaporating and liquefying means, the aforesaid parts being connected in a system, said system including a plurality of vertically extending conduits opening into the generator and adapted to receive absorption liquid from the absorber and means to alternately force gaseous and liquid fluid through one of said conduits and thereby cause a rise and fall of pressure and means to transmit said rise and fall of pressure to another of said plurality of conduits to cause a flow of unbroken liquid therethrough into the generator.

In testimony whereof we hereunto affix our signatures.

BALTZAR CARL von PLATEN.
CARL GEORG MUNTERS.